US010583929B2

(12) United States Patent
Ozaki

(10) Patent No.: US 10,583,929 B2
(45) Date of Patent: Mar. 10, 2020

(54) HELICOPTER WITH BATTERY ABNORMALITY DETECTION CAPABILITY

(71) Applicant: Yanmar Co., Ltd., Osaka-shi, Osaka (JP)

(72) Inventor: Eiichi Ozaki, Osaka (JP)

(73) Assignee: YANMAR CO., LTD., Osaka (JP)

( * ) Notice: Subject to any disclaimer, the term of this patent is extended or adjusted under 35 U.S.C. 154(b) by 340 days.

(21) Appl. No.: 15/521,560

(22) PCT Filed: Jul. 7, 2015

(86) PCT No.: PCT/JP2015/003408
§ 371 (c)(1),
(2) Date: Apr. 24, 2017

(87) PCT Pub. No.: WO2016/067489
PCT Pub. Date: May 6, 2016

(65) Prior Publication Data
US 2017/0313433 A1 Nov. 2, 2017

(30) Foreign Application Priority Data

Oct. 29, 2014 (JP) ................................. 2014-220469

(51) Int. Cl.
*B64C 27/08* (2006.01)
*B64D 17/80* (2006.01)
(Continued)

(52) U.S. Cl.
CPC .............. *B64D 27/24* (2013.01); *B64C 25/32* (2013.01); *B64C 27/08* (2013.01); *B64C 39/024* (2013.01);
(Continued)

(58) Field of Classification Search
CPC ........ B64C 2201/108; B64C 2201/042; B64C 2201/066; B64C 2201/185; B64C 25/56;
(Continued)

(56) References Cited

U.S. PATENT DOCUMENTS 5,836,544 A * 11/1998 Gentile ................. B64C 27/006
244/17.17
2003/0155463 A1* 8/2003 Cox ...................... B64C 39/024
244/3.1
(Continued)

FOREIGN PATENT DOCUMENTS

JP H 08-150818 A 6/1996
JP 2009-060695 A 3/2009
(Continued)

OTHER PUBLICATIONS

Multicopter Evolutionary Theory, Radio Control Technology, Radio Experiment Co., Ltd., Apr. 10, 2014, p. 35.
(Continued)

*Primary Examiner* — Philip J Bonzell
*Assistant Examiner* — Tye William Abell
(74) *Attorney, Agent, or Firm* — Norton Rose Fulbright US LLP

(57) ABSTRACT

A multicopter having a plurality of propellers is configured to be electrically operated. The multicopter is provided with electric motors, at least one main battery, a generator, an engine, and a battery condition detecting section. The electric motors drive the propellers. The main battery is a first electric power source that supplies the electric power to the electric motors. The generator is a second electric power source that supplies the electric power to the electric motors. The engine drives the generator. The battery condition detecting section detects abnormality of the main battery. When the battery condition detecting section detects the abnormality of the main battery, the generator supplies the electric power that has been converted from motive power from the engine directly to the electric motors.

20 Claims, 7 Drawing Sheets

(51) Int. Cl.
B64C 25/32 (2006.01)
B64D 27/24 (2006.01)
B64C 39/02 (2006.01)

(52) U.S. Cl.
CPC ........ B64D 17/80 (2013.01); *B64C 2025/325* (2013.01); *B64C 2201/024* (2013.01); *B64C 2201/027* (2013.01); *B64C 2201/042* (2013.01); *B64C 2201/108* (2013.01); *B64C 2201/185* (2013.01); *B64D 2201/00* (2013.01); *Y02T 50/44* (2013.01); *Y02T 50/64* (2013.01)

(58) Field of Classification Search
CPC .... B64C 27/006; B64D 27/24; B64D 2201/00
See application file for complete search history.

(56) References Cited

U.S. PATENT DOCUMENTS

| | | |
|---|---|---|
| 2008/0184906 A1 | 8/2008 | Kejha |
| 2009/0145998 A1 | 6/2009 | Salyer |
| 2012/0025012 A1* | 2/2012 | Arlton ................. B64C 27/10 244/17.13 |
| 2013/0147204 A1* | 6/2013 | Botti ..................... B64D 27/24 290/1 A |
| 2014/0248168 A1* | 9/2014 | Chantriaux ............ B64C 27/14 417/410.1 |
| 2015/0012154 A1* | 1/2015 | Senkel .................. B64D 17/80 701/4 |
| 2016/0179096 A1* | 6/2016 | Bradlow ................ B64C 19/00 701/8 |
| 2016/0272333 A1* | 9/2016 | Heinonen ............ B64C 39/024 |

FOREIGN PATENT DOCUMENTS

| | | | |
|---|---|---|---|
| JP | 2009060695 A | * | 3/2009 |
| JP | 2010-120641 A | | 6/2010 |
| JP | 2011-240745 A | | 12/2011 |
| WO | WO 2013/029085 A1 | | 3/2013 |

OTHER PUBLICATIONS

Translation of International Search Report of PCT/JP2015/003408, dated Jun. 5, 2016, 2 pages.

* cited by examiner

Fig.7

| LANDING MODE SELECTION MAP | | | | | | | |
|---|---|---|---|---|---|---|---|
| NUMBER OF MOTORS IN WHICH ABNORMALITY IS OCCURRED | | 1 | 2 | 3 | 4 | 5 | 6 |
| WHEN ABNORMAL MOTORS ARE ADJOININED | 0 | | 1 | 1 | 1 | 1 | 1 |
| WHEN ABNORMAL MOTORS ARE NOT ADJOINED | | | 0 | 1 | 1 | 1 | 1 |

1: FORCED LANDING MODE, 0: NON-STOP FLIGHT MODE

HELICOPTER WITH BATTERY ABNORMALITY DETECTION CAPABILITY

TECHNICAL FIELD

The present invention relates to a helicopter, and particularly relates to the helicopter having two or more rotors (rotary wings).

BACKGROUND ART

A helicopter for ascending or flying, in which a lifting power is generated by rapidly rotating the rotors that are provided at an upper portion of a bodywork of the helicopter, has been conventionally known. The helicopter that is equipped with two or more rotors is called as a multicopter. Patent Document 1 discloses this type of helicopter.

The multicopter of Patent Document 1 has two rotors, a coaxial contrarotating system for rotating the two rotors in the directions opposite to each other, a shaft that transmits the engine rotation to the coaxial contrarotating system and the rotors, an auxiliary propeller, a vertical tail, a horizontal tail, wheels that are driven by an electric motor, a generator and a battery that supply the electric power with a motor for a main rotor in emergency, a motor for the auxiliary propeller, the motor for the wheels, an engine that drives the main rotor and the generator, and a gearbox. Each of pitch angles of blades in the rotors is constant at all azimuth angles. The auxiliary propeller generates thrust in a front-back, left-right, and up-down directions.

The configuration of Patent Document 1 can achieve a simple configuration of a hinge of the helicopter, less failure rate, and safe flying.

Patent Document 2 discloses a rotary wing vehicle which is used as an unmanned aerial vehicle (UAV), and which flies by using rotary wings in the same way as the helicopter. The rotary wing vehicle has a main body structure having an elongated tubular spine or core, a first rotor system, a second rotor system, and a booster module. An electric power transmission to the rotor systems and between the two rotor systems is performed not by mechanical axis transmission, but mainly by electrical wiring. In the rotary wing vehicle, weight of the UAV can be reduced by falling off the booster module.

The configuration of Patent Document 2 can achieve an easy manufacturing. Moreover, weight of the UAV is reduced by falling off the booster module, which can achieve a continued flying in a second flying phase.

Non-Patent Document 1 discloses the above-described multicopter. In the multicopter of Non-Patent Document 1, the multicopter is driven with a hybrid of the engine and the motor, and thereby the engine works as a main power to concurrently generate thrust and power. The configuration of Non-Patent Document 1 can achieve a long-time continuous navigation.

PRIOR-ART DOCUMENTS

Patent Documents

PATENT DOCUMENT 1: Japanese Patent Application Laid-Open No. 1996-150818

PATENT DOCUMENT 2: Japanese Patent Application Laid-Open No. 2010-120641

Non-Patent Documents

NON-PATENT DOCUMENT 1: "Multicopter evolutionary theory", radio control technology, Radio Experiment Co., Ltd., Apr. 10, 2014, P. 35

SUMMARY OF THE INVENTION

Problems to be Solved by the Invention

However, since Patent Document 1 discloses a configuration that main rotors are driven by an engine, it is difficult to suppress noise and exhaust caused by the engine.

Patent Document 2 is configured to fly in two phases. When a first flying phase is finished, a power source in the first flying phase is fallen off and weight of the UAV is reduced, and thereby flying is continued in a second flying phase. However, a countermeasure if the abnormality is occurred in the power source of the UAV is not disclosed.

Similarly to Patent Document 2, Non-Patent Document 1 does not disclose a configuration for dealing with occurrence of the abnormality.

The present invention is made under the circumstances described above, and an object of the present invention is to provide a helicopter in which a battery is a main electric power source, and an emergency power source is separately provided.

Means for Solving the Problems and Effects Thereof

Problems to be solved by the present invention are as described above, and next, means for solving the problems and effects thereof will be described.

In an aspect of the present invention, a helicopter having the following configuration is provided. That is, the helicopter having a plurality of rotors is configured to be electrically operated. The helicopter includes electric motors, at least one battery, a generator, an engine, and a battery abnormality detecting section. The electric motors drive the rotors. The battery is a first electric power source that supplies the electric power with the electric motors. The generator is a second electric power source that supplies the electric power with the electric motors. The engine drives the generator. The battery abnormality detecting section detects abnormality of the battery. When the battery abnormality detecting section detects abnormality of the battery, the generator supplies the electric power that has been converted from motive power from the engine directly to the electric motors.

Accordingly, the battery drives the electric motors, which can reduce noise. Moreover, the helicopter can be driven by the generator as the second electric power source that is driven by the engine if abnormality such as overheating or abnormal voltage drop in the battery as the first electric power source is occurred, which can avoid fall accident that is caused by power loss of the helicopter.

In the helicopter, when the battery abnormality detecting section detects the abnormality of the battery, it is preferable that the electric power that has been converted from motive power from the engine is supplied to the electric motors and then the helicopter lands.

Accordingly, since the generator supplies the electric power for landing with the helicopter when the abnormality of the battery is detected, the helicopter can land safely.

The helicopter is preferably configured as follows. That is, the helicopter includes at least one airbag. The airbag is used for emergency landing.

Accordingly, in emergency landing, damage of the helicopter can be appropriately avoided.

The helicopter is preferably configured as follows. That is, the plurality of electric motors is provided for driving each of the rotors. The helicopter includes a motor abnormality detecting section that detects the abnormality of the electric motors. The helicopter lands with a different landing mode based on the number of the electric motors in which the abnormality is detected by the motor abnormality detecting section.

Accordingly, since the severity of abnormality of the helicopter can be assumed based on the number of the electric motors in which abnormality is occurred, the landing ways of the helicopter can be appropriately determined.

It is preferable that the helicopter lands with a different landing mode based on the number and position of electric motors in which the abnormality is detected by the motor abnormality detecting section.

Accordingly, the severity of the abnormality of the helicopter can be further accurately assumed by considering the position of the electric motors in addition to the number of electric motors in which the abnormality is occurred, which can further appropriately determine the landing way of the helicopter.

The helicopter is preferably configured as follows. That is, the landing mode includes a non-stop flight mode and a forced landing mode. The non-stop flight mode is a mode for landing in accordance with the user's instructions while continuing the flight. The forced landing mode is a mode for immediately making a forced landing.

Accordingly, when the abnormality is occurred in the electric motors, an appropriate landing mode can be selected depending on the urgency.

The helicopter is preferably configured as follows. That is, the helicopter includes an airbag, a parachute, and a flight level measuring section. The flight level measuring section measures a flight level. Forced landing of the helicopter can be made by using at least one of the airbag and the parachute.

Accordingly, when making the forced landing, since means for avoiding damage of the helicopter can be selectively used depending on the flight level, the possibility of success in the forced landing can be improved.

The helicopter preferably includes an electric power source that opens at least either one of the airbag or the parachute, the electric power source that is provided separately from the battery and the generator.

Accordingly, even if both of the battery and the generator are failed, the emergency landing of the helicopter can be safely made by the electric power source which is separately provided.

BRIEF DESCRIPTION OF THE DRAWINGS

FIG. 7 A diagram showing an example of a landing mode selection map.

EMBODIMENT FOR CARRYING OUT THE INVENTION

Figure 1:
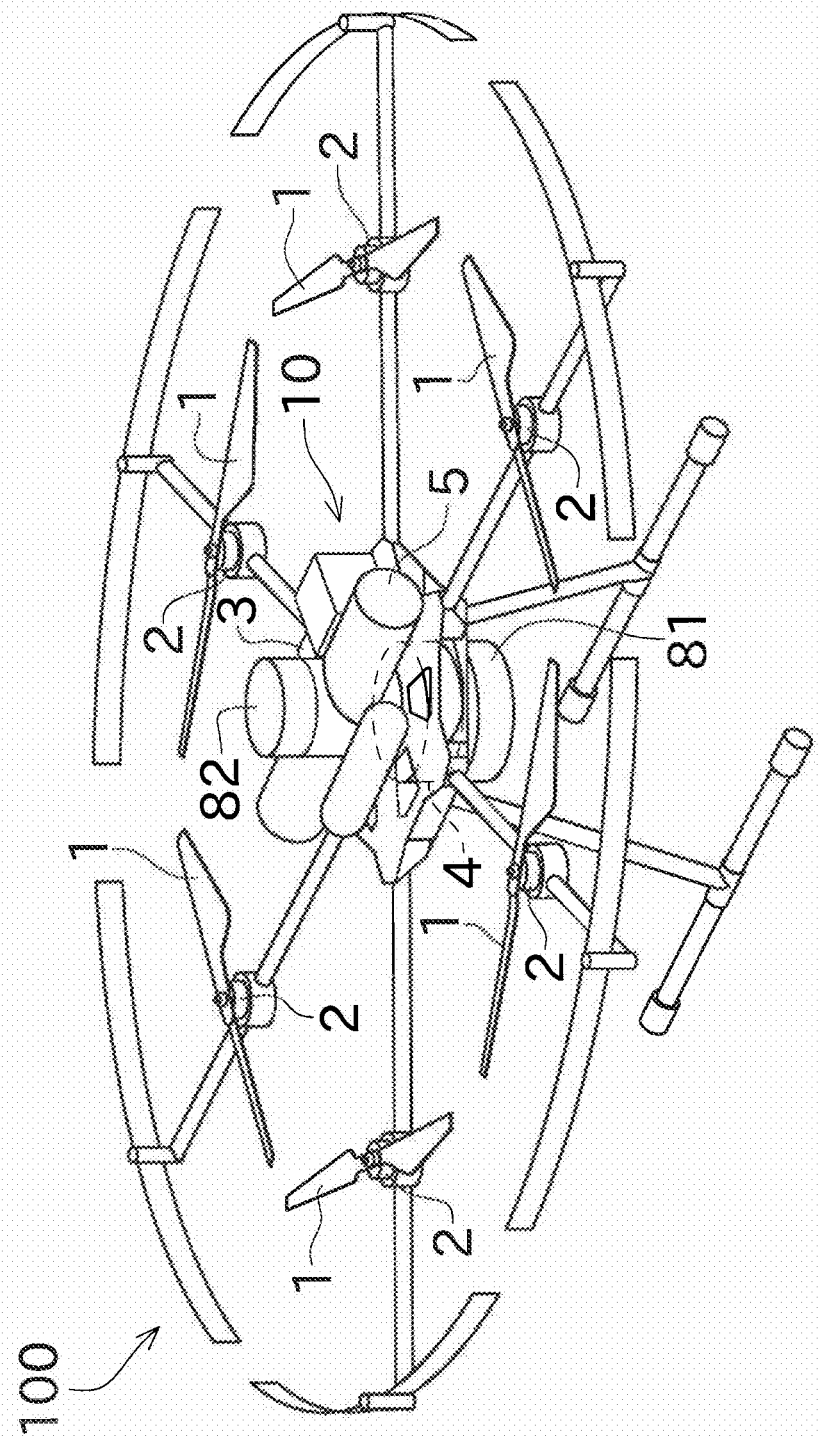
FIG. 1 A perspective view showing an overall configuration of a multicopter according to one embodiment of the present invention.

Next, some embodiments of the present invention will be described with reference to the drawings. FIG. 1 is a perspective view showing an overall configuration of a multicopter 100.

The multicopter (helicopter) 100 shown in FIG. 1 is configured as an electric unmanned helicopter that is equipped with a plurality of propellers (rotors) 1 (in this embodiment, six propellers). The multicopter 100 can be radio-operated by remote control. As shown in FIG. 1, the multicopter 100 includes a bodywork 10, six propellers 1, electric motors 2, a main battery (battery) 3, a generator 4, and an engine 5.

The bodywork 10 is arranged in a central portion of the multicopter 100. The electric motors 2, the main battery 3, the generator 4, and the engine 5 are installed in the bodywork 10.

As shown in FIG. 1, the propellers 1 are arranged on a circle centered at the bodywork 10 at regular intervals. The multicopter 100 flies by simultaneously rotating each of the propellers 1.

The electric motors 2 that are arranged below each of the propellers 1 drive the propellers 1. Each of the electric motors 2 is electrically connected to the main batteries 3. The main batteries 3 supply the electric power with each of the electric motors 2.

When a remaining capacity of the main battery 3 is equal to or less than a predetermined threshold, in the multicopter 100, the main battery 3 can be charged by operation of the generator 4 and the engine 5.

The generator 4 that is installed in a lower portion of the bodywork 10 is configured to charge the electric power to the electric motors 2 when abnormality is occurred in the main battery 3.

The engine 5 is a power source of the generator 4. A small diesel engine or a reciprocating engine can be used as the engine 5.

In the above-described configuration, the multicopter 100 of this embodiment supplies the electric power of the main battery 3 to the electric motors 2 and thereby flies by rotating the six propellers 1.

Figure 2:
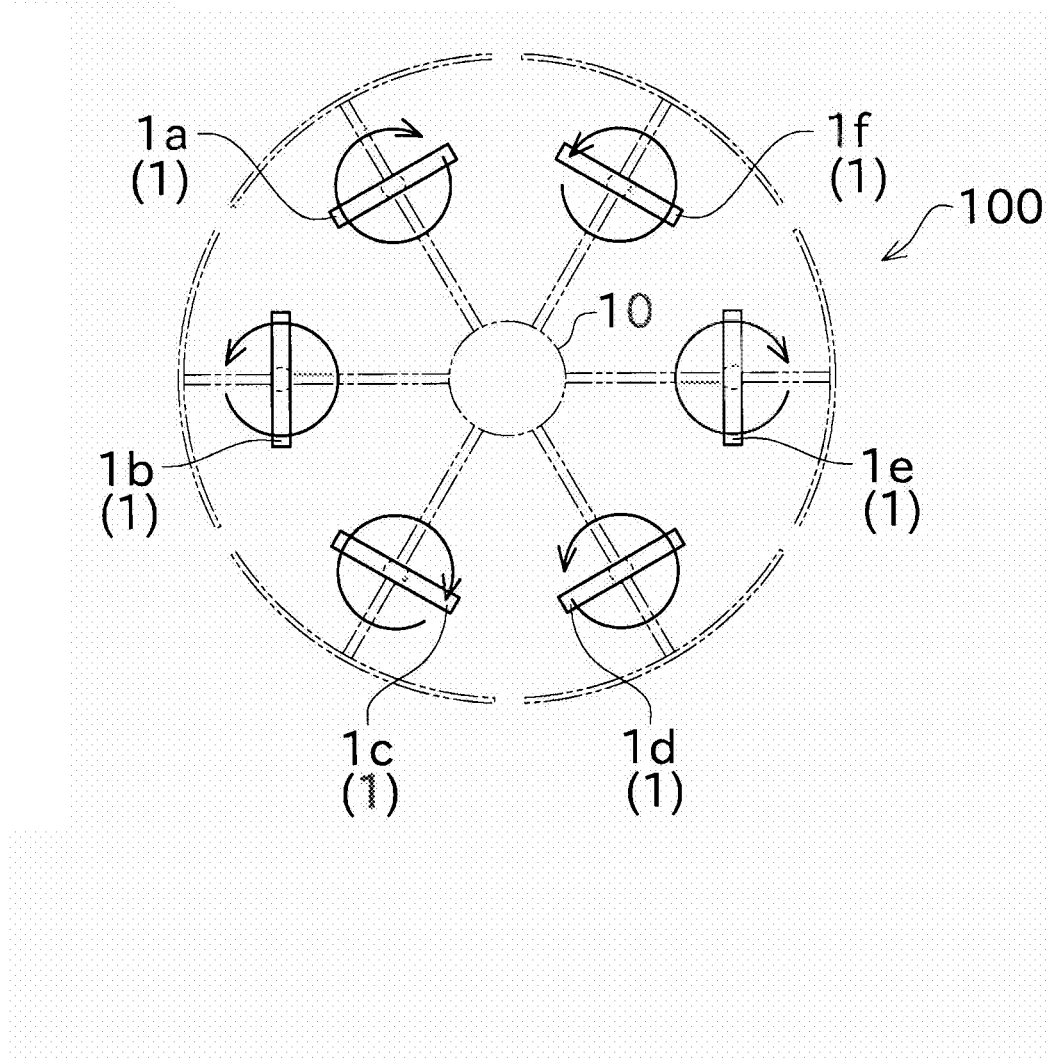
FIG. 2 A schematic plan view showing rotation of propellers in the multicopter.

Although the principle of flight of the multicopter 100 has been known, in the following, flight of the multicopter 100 will be briefly described with reference to FIG. 2. FIG. 2 is a schematic plan view showing rotation of each of the propellers 1 in the multicopter 100.

As shown in FIG. 2, rotational directions of the six propellers 1 included in the multicopter 100 is set to reverse the rotational directions between the adjacent propellers 1 (for example, a propeller 1a and a propeller 1b) in a circumferential direction. Accordingly, since rotation torques that are generated by rotating the propellers 1 are offset to each other, the multicopter 100 can preferably ascend by obtaining a climbing power without turning due to rotation of the propellers 1.

Hovering or level flight of the multicopter 100 can be achieved by controlling a rotation speed of the each of the propellers 1 and balancing between a lifting power that is obtained by rotating the propellers 1 and gravity of the multicopter 100. The multicopter 100 can descend by decreasing the lifting power that is generated by the propellers 1.

Turning of the multicopter 100 can be achieved by controlling the rotation speed of each of the propellers 1 and causing imbalance in rotation torques that are generated by rotating the six propellers 1.

As described above, the multicopter 100 flies while controlling rotating the plurality of propellers 1 by the electric motors 2. Therefore, when abnormality is occurred in the main battery 3 that is a power source of the electric motors 2, or abnormality is occurred in the electric motors 2, the multicopter 100 may be damaged by crash.

Figure 3:
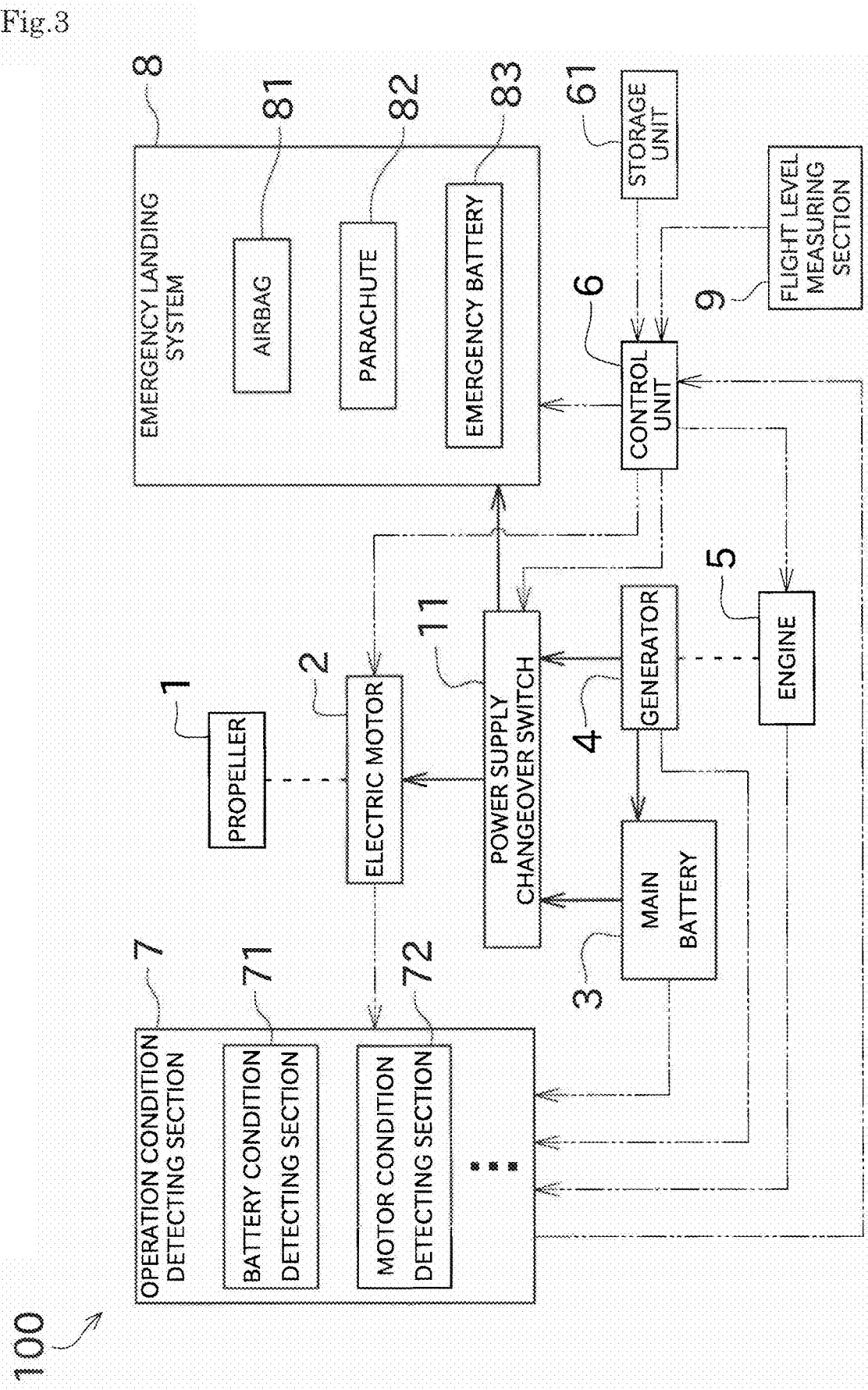
FIG. 3 A block diagram showing an outline of a configuration of the multicopter.

In this respect, as shown in FIG. 3, the multicopter 100 of this embodiment includes the above-described propellers 1, the electric motors 2, the main battery 3, the generator 4, and the engine 5, as well as a control unit 6, a storage unit 61, an operation condition detecting section 7, an emergency landing system 8, and a flight level measuring section 9.

The control unit 6 is configured as a small computer. The control unit 6 can control the flight of the multicopter 100 in accordance with an operation command by radio from the user. The control unit 6 can allow the multicopter 100 to land when the operation condition detecting section 7 detects abnormality in the multicopter 100.

The storage unit 61 stores parameters (for example, a flight level setting value, etc.) which are preset with respect to operation of the emergency landing system 8.

The operation condition detecting section 7 configured to detect an operation condition of each part in the multicopter 100 includes a battery condition detecting section 71, a motor condition detecting section 72 and the like.

The battery condition detecting section 71 is configured to detect a battery abnormality such as overheating and abnormal voltage drop, or the remaining capacity of the battery. For example, when the battery condition detecting section 71 detects an abnormal voltage drop while monitoring an output voltage of the main battery 3, it can be determined that the battery is abnormal.

The motor condition detecting section 72 is configured to detect a motor abnormality such as overheating, vibration and rotation instability, rotation speed of the motors, rotation torques, and the like. For example, when the motor condition detecting section 72 detects an abnormal driving current while comparing a driving current of each of the electric motors 2 with a preset reference value, it can be determined that the motor is abnormal. When the motor condition detecting section 72 having a temperature sensor such as a thermistor that is arranged near the electric motors 2 detects an excessive temperature rise of the electric motors 2 by using the temperature sensor, it can be determined that the motor is abnormal.

The emergency landing system 8 includes an airbag 81, a parachute 82, and an emergency battery 83. The emergency landing system 8 is used for emergency landing (forced landing) in abnormality occurrence of the multicopter 100. The airbag 81 and the parachute 82 are used as an auxiliary landing system in forced landing.

Figure 4:
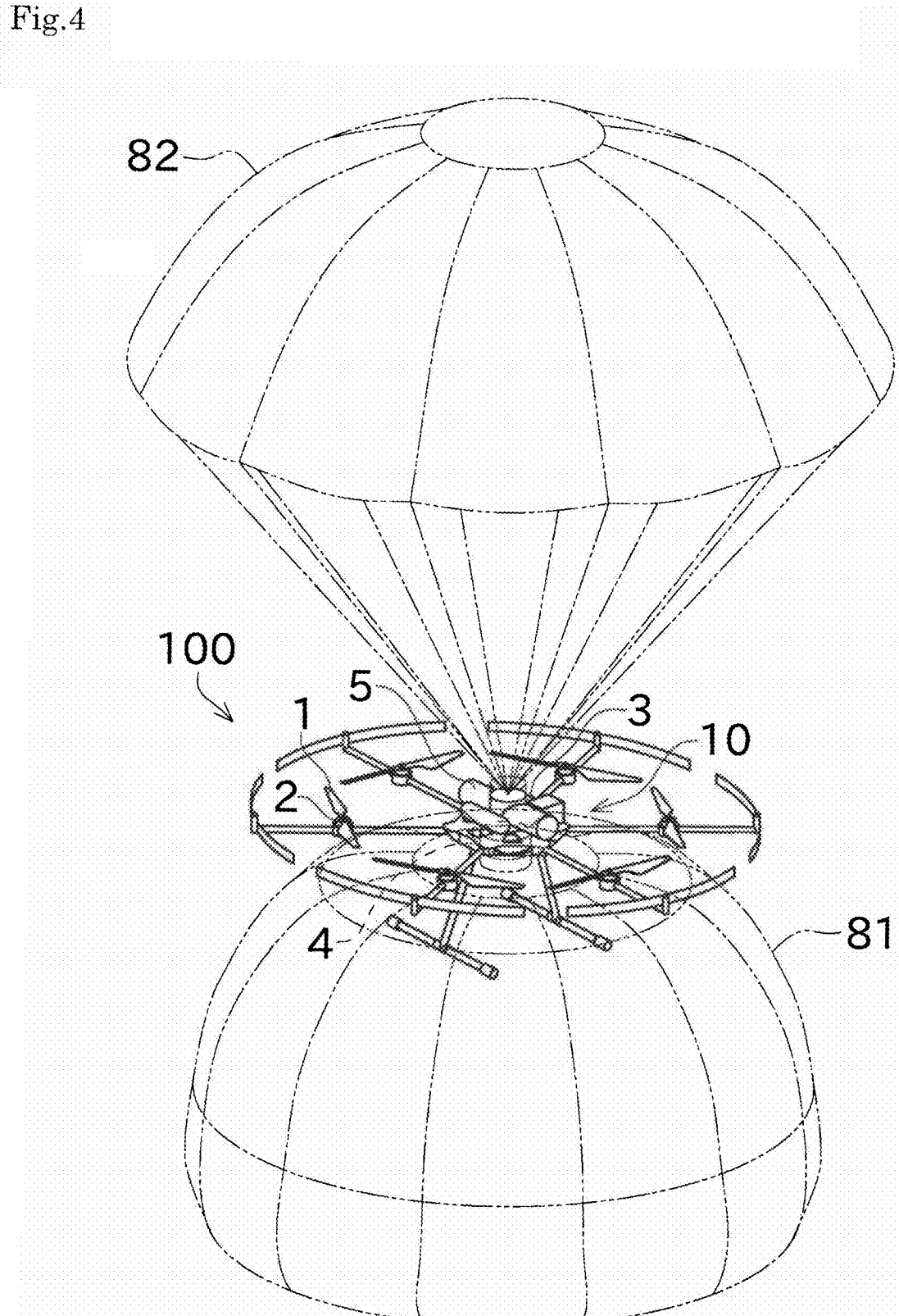
FIG. 4 A diagram showing a situation that a parachute and an airbag are opened.

The airbag 81 is stored in a lower portion of the bodywork 10. The airbag 81 is configured to open and expand in forced landing, as shown in FIG. 4. The parachute 82 is stored in an upper portion of the bodywork 10. The parachute 82 is configured to open upward in forced landing as shown in FIG. 4.

The flight level measuring section 9 can measure a flight level of the multicopter 100. The control unit 6 can adjust the flight level of the multicopter 100 to the level that is instructed by a user based on the flight level that is detected by the flight level measuring section 9. In emergency landing, the control unit 6 can select an appropriate auxiliary landing system and open it depending on the flight level that is detected by the flight level measuring section 9.

In the above-described configuration, in the multicopter 100 of this embodiment, since the electric power can be supplied with the electric motors 2 by operation of the engine 5 and the generator 4 even if the abnormality is occurred in the main battery 3, fall accident caused by power loss can be avoided. In the multicopter 100 of this embodiment having the airbag 81 and the parachute 82 as the auxiliary landing system, since an opening of the airbag 81 or the parachute 82 can be selected depending on the flight level when forced landing is needed, damage of the multicopter 100 in emergency landing can be appropriately avoided.

Next, in the multicopter 100 of this embodiment, a configuration for landing the multicopter 100 when the abnormality is occurred in the main battery 3 as a main electric power source will be described.

As shown in FIG. 3, the main battery 3 and the generator 4 are connected to an electric power supply changeover switch 11. The electric power from the main battery 3 or the generator 4 can be supplied to the electric motors 2 via the electric power supply changeover switch 11. When the battery condition detecting section 71 detects abnormality of the main battery 3, the control unit 6 transmits an operation command to the engine 5 and the generator 4 and transmits a switching command to the electric power supply changeover switch 11, and thereby controls such that the electric power is supplied from the generator 4 to the electric motors 2. The control unit 6 makes the multicopter 100 land by using the electric power from the generator 4.

The multicopter 100 of this embodiment has a non-stop flight mode and a forced landing mode, as a landing mode. The non-stop flight mode is a mode to continue the flight of the multicopter 100 and then to land after moving the multicopter 100 to an appropriate point (for example, a takeoff point or a place in user's own setting) in accordance with instructions by user's operation. The forced landing mode is a mode that is used for emergency landing, the mode to immediately make forced landing of the the multicopter 100 by using the airbag 81 or the parachute 82. When the operation condition detecting section 7 detects abnormality in the multicopter 100, the control unit 6 selects an appropriate landing mode, and then makes forced landing of the multicopter 100.

Figure 5:
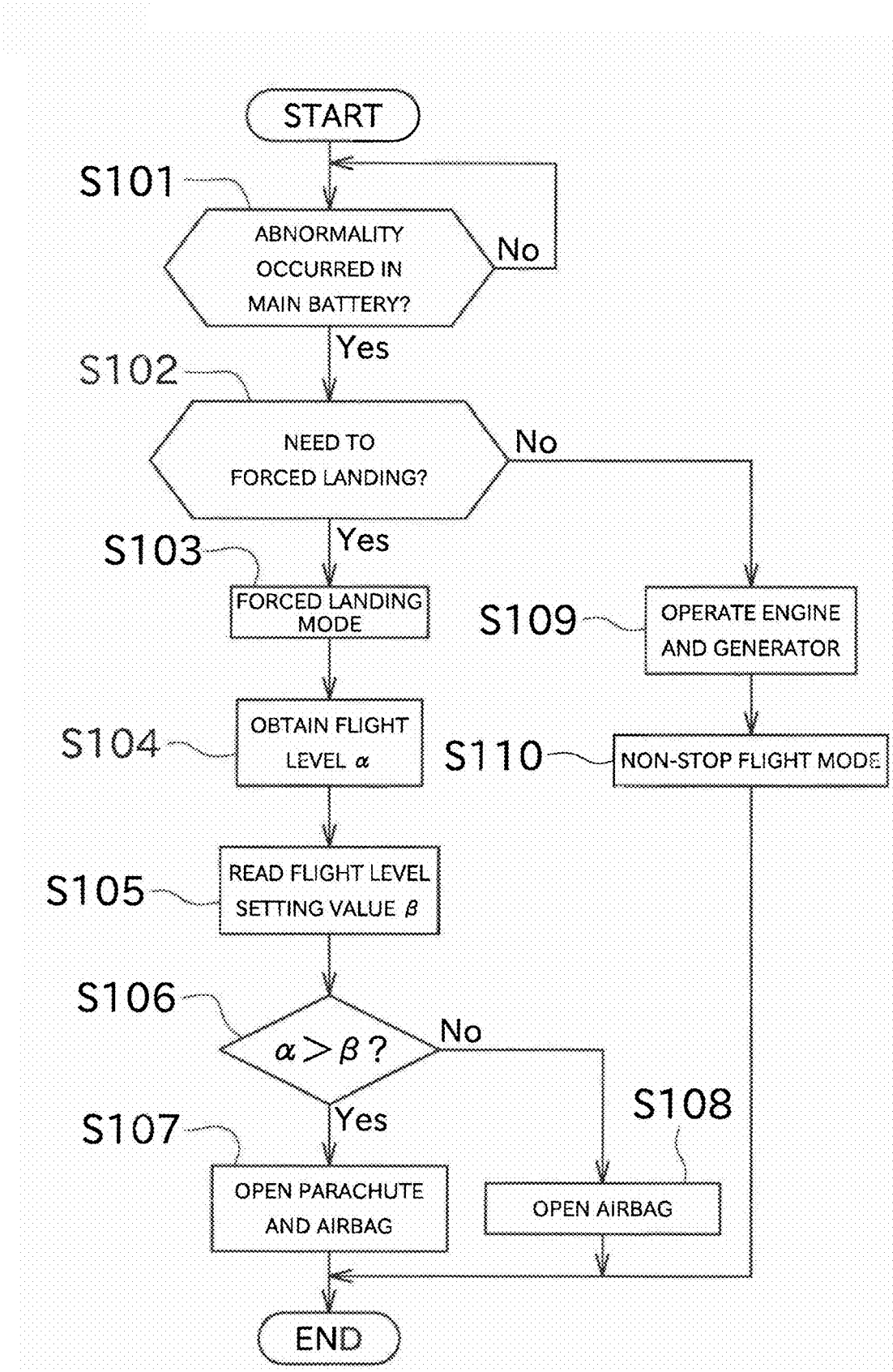
FIG. 5 A flowchart showing an example of control that is performed in a control unit with respect to abnormality of a main battery.

Next, control for landing when the control unit 6 detects abnormality of the main battery 3 and abnormality is occurred will be described with reference to FIG. 5. FIG. 5 is a flowchart showing an example of control that is performed in the control unit 6 with respect to abnormality of the main battery 3.

When starting a flow shown in FIG. 5, the control unit 6 firstly determines whether or not abnormality is occurred in the main battery 3 based on a condition of the main battery 3 that is detected by the battery condition detecting section 71 (step S101). When abnormality is not occurred in the main battery 3, the step is returned to the step S101. When abnormality is occurred in the main battery 3, the control unit 6 determines whether or not forced landing is needed, based on an operation condition in other parts in the multicopter 100, which is detected by the operation condition detecting section 7 such as the motor condition detecting section 72 (step S102).

If forced landing is needed, the control unit 6 selects the forced landing mode and then immediately makes landing of the multicopter 100 (step S103). In this case, the control unit 6 firstly obtains a current flight level α of the multicopter 100 from the flight level measuring section 9 (step S104), and reads a flight level setting value β that is preset with respect to an opening of the auxiliary landing system provided with the emergency landing system 8, from the storage unit 61 (step S105). Then, the control unit 6 compares the two obtained values (step S106). When the current flight level α of the multicopter 100 is above the flight level setting value β, as shown in FIG. 4, forced landing (soft landing) of the multicopter 100 is made by opening both of the airbag 81 and the parachute 82 (step S107). When the current flight level α of the multicopter 100 is equal to or less than the flight level setting value β, forced landing of the multicopter 100 is made by opening only the airbag 81 (step S108).

When it is determined in the step S102 that forced landing is not needed, the control unit 6 operates the engine 5 and the generator 4, and thereby supplies the electric power to the electric motors 2 in place of the main battery 3 (step S109) and makes the flight of the multicopter 100 depending on the user's operation (non-stop flight mode, step S110). The multicopter 100 flies to the appropriate point and lands in accordance with the user's instructions.

Figure 6:
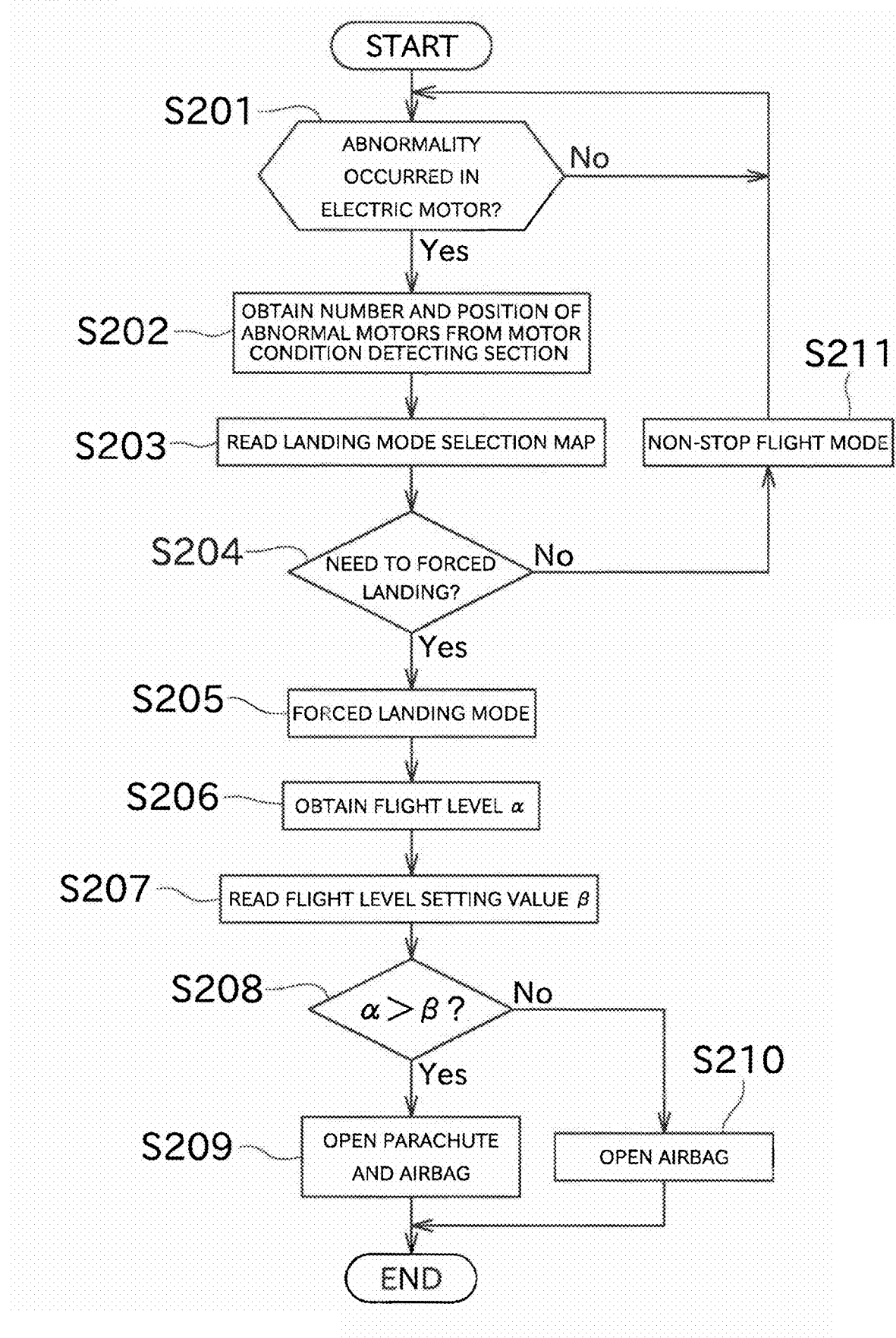
FIG. 6 A flowchart showing an example of control that is performed in the control unit with respect to abnormality of an electric motor.

Next, control for landing when abnormality of the electric motors 2 is detected by the control unit 6 and abnormality is occurred will be described with reference to FIG. 2 and FIG. 6. FIG. 6 is a flowchart showing an example of control that is performed in the control unit 6 with respect to abnormality of the electric motor 2.

When starting a flow shown in FIG. 6, the control unit 6 firstly determines whether or not abnormality is occurred in the electric motors 2 based on an operation condition of a motor that is detected by the motor condition detecting section 72 (step S201). When abnormality is not occurred in the electric motors 2, the step is returned to the step S201. When abnormality is occurred in the electric motors 2, the control unit 6 obtains the number and position of the electric motors 2 in which abnormality is occurred, from the motor condition detecting section 72 (step S202), and reads a landing mode selection map from the storage unit 61 (step S203). Then, the control unit 6 determines whether or not forced landing is needed, based on the number and position of the electric motors 2 in which abnormality is occurred and the landing mode selection map (step S204).

The landing mode selection map may be adopted as a map shown in FIG. 7, for example. In the landing mode selection map of FIG. 7, when abnormality is occurred merely in one of six electric motors 2 (for example, the electric motor 2 of the propeller 1a shown in FIG. 2), the multicopter 100 continues to fly (non-stop flight mode). In this case, the multicopter 100 can return to a position desired by the user (for example, a takeoff position or a place in user's setting) in accordance with the instructions from the user with radio operation. At this time, the control unit 6 stops rotation of the propeller 1a with respect to the electric motor in which abnormality is occurred, and stops rotation of a propeller 1d opposing to the propeller 1a, which can balance rotation torques. Then, the multicopter 100 flies by using the remaining four propellers 1.

When abnormality is occurred in two of the six electric motors 2, the control unit 6 determines whether or not two electric motors having abnormality are adjacent to each other. When two electric motors having abnormality are adjacent to each other (for example, when abnormality is occurred in both of the electric motor 2 of the propeller 1d and the electric motor 2 of the propeller 1e), since it is difficult to balance a lifting power, the mode of the multicopter 100 is switched to the forced landing mode and then makes emergency landing by using the auxiliary landing system provided with the emergency landing system 8. When two electric motors having abnormality are not adjacent to each other (for example, when abnormality is occurred in both of the electric motor 2 of a propeller 1c and the electric motor 2 of a propeller 1f), the control unit 6 stops two electric motors 2 and continues the flight of the multicopter 100 (non-stop flight mode).

When the number of electric motors 2 in which abnormality is occurred in the six electric motors 2 is three or more, the mode of the multicopter 100 is switched to the forced landing mode and then makes emergency landing, regardless of the position of the electric motors having abnormality.

The landing mode can be appropriately selected depending on circumstances by using the above-described landing mode selection map. However, the above-described landing mode selection map is merely illustrative, it is appropriately changeable.

The description of control that is performed in the control unit 6 (S205 to S210) when it is determined in the step S204 that forced landing is needed will be omitted since these steps are similar to that of S103 to S108. When it is determined in the step S204 that forced landing is not needed, the control unit 6 makes the flight of the multicopter 100 depending on the user's operation (non-stop flight mode, step S211). In the non-stop flight mode, the control unit 6 repeatedly performs determination of the step S201 and monitors abnormality of the electric motors 2. When abnormality is additionally occurred in the electric motors 2, the steps S202 to S204 are performed and then it is determined in the step S204 again whether or not forced landing is needed.

As shown in FIG. 3, the multicopter 100 of this embodiment is configured that the electric power is supplied from the main battery 3 and the generator 4 to the emergency landing system 8. In the multicopter 100 of this embodiment, the emergency battery 83 is further provided as a dedicated electric power source for the emergency landing system 8.

Accordingly, even when the electric power cannot be supplied due to abnormality occurrence in the main battery 3 as the electric power source of the multicopter 100 of this embodiment and due to abnormality occurrence in either the engine 5 or the generator 4, with the use of the emergency battery 83, the multicopter 100 can make emergency landing by opening the airbag 81 and the parachute 82 of the auxiliary landing system.

As described above, the multicopter 100 of this embodiment having the plurality of propellers 1 is configured to be electrically operated. The multicopter 100 includes the electric motors 2, the main battery 3, the generator 4, the engine 5, and the battery condition detecting section 71. The electric motors 2 drive the propellers 1. The main battery 3 is a first electric power source that supplies the electric power with the electric motors 2. The generator 4 is a second electric power source that supplies the electric power with the electric motors 2. The engine 5 drives the generator 4. The battery abnormality detecting section 71 detects abnormality of the main battery 3. When the battery abnormality detecting section 71 detects abnormality of the main battery 3, the generator 4 supplies the electric power that has been converted from motive power from the engine 5, directly to the electric motors 2.

Accordingly, the main battery 3 drives the electric motors 2, which can reduce noise and exhaust. Moreover, the multicopter 100 can be driven by the generator 4 as the second electric power source that is driven by the engine 5 if abnormality such as overheating or abnormal voltage drop in the main battery 3 as the first electric power source is occurred, which can avoid fall accident that is caused by power loss of the multicopter 100.

In the multicopter 100 of this embodiment, when the battery abnormality detecting section 71 detects the abnormality of the main battery 3, the electric power that has been converted from motive power from the engine 5 is supplied to the electric motors 2 and then the multicopter 100 lands.

Accordingly, the generator 4 supplies the electric power for landing to the multicopter 100 when abnormality of the main battery 3 is detected, which can make safe landing of the multicopter 100.

The multicopter 100 of this embodiment includes at least one airbag 81. The airbag 81 is used for emergency landing.

Accordingly, damage of the multicopter 100 can be appropriately avoided in emergency landing.

In the multicopter 100 of this embodiment, the plurality of electric motors 2 is provided so as to drive each of the plurality of propellers 1. The multicopter 100 includes the motor condition detecting section 72 that detects abnormality of the electric motors 2. The multicopter 100 lands with a different landing mode based on the number of electric motors 2 in which abnormality is detected by the motor condition detecting section 72.

Accordingly, since the severity of abnormality of the multicopter 100 can be assumed based on the number of the electric motors 2 in which abnormality is occurred, the landing ways of the multicopter 100 can be appropriately determined.

The multicopter 100 of this embodiment is configured to land with a different landing mode based on the number and position of electric motors 2 in which abnormality is detected by the motor abnormality detecting section 72.

Accordingly, the severity of abnormality of the multicopter 100 can be further accurately assumed by considering the position of the electric motors 2 in addition to the number of electric motors 2 in which abnormality is occurred, which can further appropriately determine the landing way of the multicopter 100.

In the multicopter 100 of this embodiment, the landing mode includes a non-stop flight mode and a forced landing mode. The non-stop flight mode is a mode for landing in accordance with the user's instructions while continuing the flight. The forced landing mode is a mode for immediately making a forced landing.

Accordingly, when the abnormality is occurred in the electric motors 2, an appropriate landing mode can be selected depending on the urgency.

The multicopter 100 of this embodiment includes the airbag 81, the parachute 82, and the flight level measuring section 9. The flight level measuring section 9 measures a flight level. Forced landing of the multicopter 100 can be made by using at least either one of the airbag 81 or the parachute 82.

Accordingly, when making the forced landing, since means for avoiding damage of the multicopter 100 can be selectively used depending on the flight level, the possibility of success in the forced landing can be improved.

The multicopter 100 includes the emergency battery 83 as an electric power source that opens the airbag 81 and the parachute 82. The emergency battery 83 is provided separately from the main battery 3 and the generator 4.

Accordingly, even if both of the main battery 3 and the generator 4 are failed, the emergency landing of the multicopter 100 can be safely made by the electric power source which is separately provided.

While some preferred embodiments of the present invention have been described above, the foregoing configurations may be modified, for example, as follows.

As described above, although the control unit 6 of this embodiment is configured to determine whether or not to make emergency landing by using the landing mode selection map, the method for determination is not limited to this. The control unit 6 may determine the necessity of emergency landing by using other methods. In consideration of only the number of electric motors 2 having abnormality occurrence, for example, easy control of selecting the non-stop flight mode if abnormality is occurred in one electric motor 2 and selecting the forced landing mode if abnormality is occurred in two or more electric motors 2, may be performed.

In the multicopter 100 of this embodiment, if both of the airbag 81 and the parachute 82 are need to be opened, both of the airbag 81 and the parachute 82 may be opened at the same time. The airbag 81 and the parachute 82 may be opened immediately before landing.

The number of the main batteries 3 is not limited to one, as shown in the above-described embodiments. A plurality of main batteries may be adoptable.

The generator 4 and the engine 5 may be configured to operate as necessary, for supplying the electric power or power as well as charging to the main battery 3, in a case other than abnormality occurrence.

The number of propellers 1 is not limited to six, as shown in the above-described embodiments. Five or less, or seven or more propellers 1 may be adoptable.

DESCRIPTION OF THE REFERENCE NUMERALS 1 propeller (rotor)
2 electric motor
3 main battery (battery)
4 generator
5 engine
71 battery condition detecting section (battery abnormality detecting section)
72 motor condition detecting section (motor abnormality detecting section)
81 airbag
82 parachute
83 emergency battery
100 multicopter (helicopter)

The invention claimed is:

1. An electric helicopter comprising:
a plurality of rotors;
a plurality of electric motors configured to drive the plurality of rotors;
at least one battery as a first electric power source configured to supply first electric power to the plurality of electric motors;
a generator as a second electric power source configured to supply second electric power to the electric motors;

an engine configured to drive the generator; and
a battery abnormality detecting section configured to detect an abnormality of the at least one battery;
wherein:
the generator is configured to supply the second electric power, that has been converted from motive power from the engine, directly to one or more electric motors of the plurality of electric motors in response to the abnormality of the at least one battery being detected by the battery abnormality detecting section.

2. The electric helicopter according to claim 1, further comprising:
an emergency landing system, the emergency landing system configured to land the electric helicopter in response to the battery abnormality detecting section detecting the abnormality of the at least one battery.

3. The electric helicopter according to claim 1, further comprising:
at least one airbag; and
a control unit configured to initiate deployment of the at least one airbag during an emergency landing.

4. The electric helicopter according to claim 1, further comprising:
a control unit;
at least one airbag;
landing gear;
a parachute; and
a flight level measuring section configured to measure a flight level of the electric helicopter;
wherein:
the control unit is configured to make a forced landing of the electric helicopter by using at least either one of the airbag or the parachute and based on the flight level that is measured by the flight level measuring section.

5. The electric helicopter according to claim 4, further comprising:
an emergency electric power source configured to deploy at least either one of the at least one airbag or the parachute, wherein the emergency electric power source is distinct from the at least one battery and the generator.

6. The electric helicopter according to claim 1, further comprising:
a motor abnormality detecting system configured to detect an abnormality in one or more electric motors of the plurality of electric motors.

7. The electric helicopter according to claim 6, further comprising:
a control unit configured to:
determine a particular landing mode of a plurality of landing modes based on a number of the one or more electric motors in which the abnormality was detected by the motor abnormality detecting section; and
land the electric helicopter according to the determined particular landing mode.

8. The electric helicopter according to claim 1, wherein:
each electric motor of the plurality of electric motors is configured to drive a corresponding rotor of the plurality of rotors, and
further comprising:
a motor abnormality detecting section configured to detect an abnormality in the one or more electric motors of the plurality of electric motors; and
a control unit configured to land the electric helicopter in a particular landing mode of a plurality of landing modes based on a number of electric motors of the plurality of electric motors in which an abnormality is detected by the motor abnormality detecting section.

9. The electric helicopter according to claim 8, wherein:
the control unit is configured to determine the landing mode based on the number and a position of the plurality of electric motors in which the abnormality is detected by the motor abnormality detecting section.

10. The electric helicopter according to claim 8, wherein:
the plurality of landing modes include a non-stop flight mode and a forced landing mode;
the non-stop flight mode is a mode for landing in accordance with user's instructions while continuing a flight; and
the forced landing mode is a mode for immediately making a forced landing.

11. A control system for the electric helicopter of claim 1, the control system comprising:
a control unit configured to cause the generator to supply the second electric power, that has been converted from motive power from the engine, directly to one or more electric motors of the plurality of electric motors in response to the abnormality of the at least one battery being detected by the battery abnormality detecting section.

12. The control system according to claim 11, further comprising:
an emergency landing system including at least one airbag, wherein the control unit is further configured to deploy the at least one airbag during an emergency landing.

13. The control system according to claim 11, further comprising:
an emergency landing system comprising:
a first emergency landing device; and
a second emergency landing device; and
an altitude measurement device configured to measure an altitude of the electric helicopter, wherein:
the control unit is further configured to activate the first emergency landing device or the second emergency landing device based on the altitude measured by the altitude measurement device.

14. The control system according to claim 13, further comprising:
a third power source configured to supply power to the emergency landing system, the third power source distinct from the at least one battery and the generator.

15. The control system according to claim 11, further comprising:
a motor abnormality detecting section configured to detect an abnormality in one or more electric motors of the plurality of electric motors, wherein the control unit is configured to select an operation mode based on a number of electric motors in which an abnormality is detected by the motor abnormality detecting section.

16. The control system according to claim 15, wherein:
the operation mode comprises a landing mode; and
the control unit is further configured to select the landing mode based on a position of the electric motors in which the abnormality was detected by the motor abnormality detecting section.

17. The control system according to claim 16, wherein:
the landing mode is a non-stop flight mode that is a mode for landing in accordance with user's instructions while continuing a flight or is a forced landing mode that is a mode for making a forced landing.

18. A method for operating an electric helicopter, the method comprising:

detecting an abnormality of at least one battery of one or more batteries, wherein the one or more batteries provide first electric power to a plurality of electric motors which drive a plurality of rotors; and responsive to detecting the abnormality of the at least one battery, supplying second electric power from a generator directly to one or more electric motors of the plurality of electric motors.

19. The method according to claim 18, further comprising:

detecting a second abnormality of one or more second electric motors of the plurality of electric motors;

responsive to detecting the second abnormality of the one or more second electric motors of the plurality of electric motors, determining a landing mode based on a number of electric motors of the plurality of electric motors in which an abnormality was detected, a position of the electric motors of the plurality of electric motors in which the abnormality was detected, or both; and operating the electric helicopter in accordance with the landing mode.

20. The method according to claim 19, further comprising:

detecting a third abnormality of one or more third electric motors of the plurality of electric motors; and responsive to detecting the third abnormality, landing the electric helicopter in accordance with a forced landing mode.

* * * * *